(No Model.)

S. GARVIN.
MOWING MACHINE.

No. 357,590. Patented Feb. 15, 1887.

WITNESSES

INVENTOR,
Samuel Garvin:
By his Attorneys

United States Patent Office.

SAMUEL GARVIN, OF PRAIRIE CREEK, ASSIGNOR OF ONE-HALF TO W. R. MERCER, OF TERRE HAUTE, INDIANA.

MOWING-MACHINE.

SPECIFICATION forming part of Letters Patent No. 357,590, dated February 15, 1887.

Application filed February 17, 1886. Serial No. 192,261. (No model.)

*To all whom it may concern:*

Be it known that I, SAMUEL GARVIN, a citizen of the United States, residing at Prairie Creek, in the county of Vigo and State of Indiana, have invented a new and useful Improvement in Mowing-Machines, of which the following is a specification, reference being had to the accompanying drawings.

My invention relates to an improvement in mowing-machines; and it consists in the peculiar construction and combination of devices, that will be more fully set forth hereinafter, and particularly pointed out in the claims.

Figure 1:
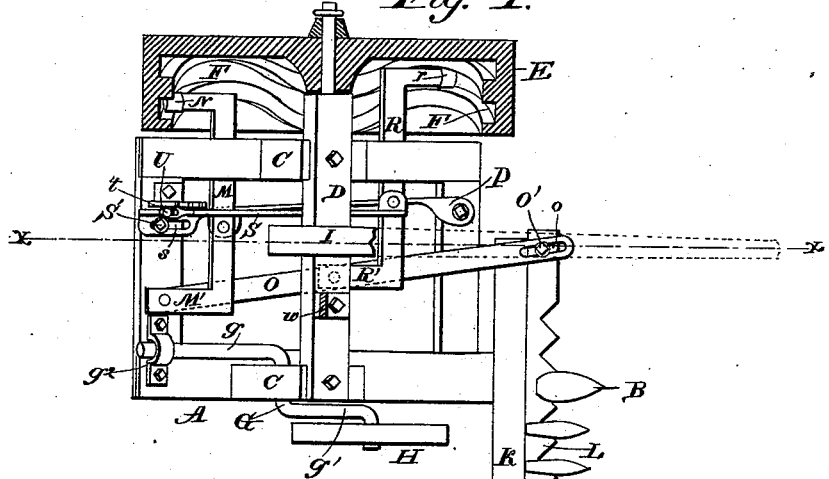
Figure 2:
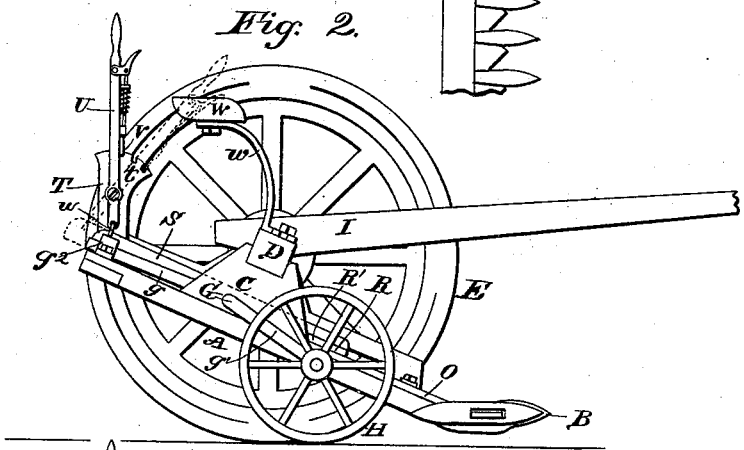
Figure 3:
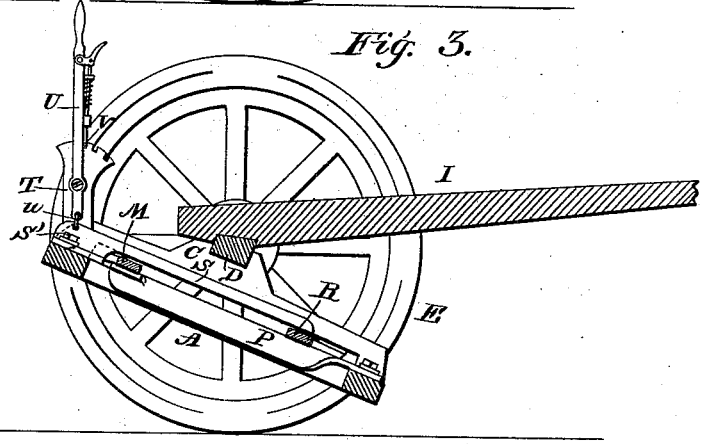

In the drawings, Figure 1 is a top plan view of a mowing-machine embodying my invention, partly in section. Fig. 2 is a side elevation of the same. Fig. 3 is a vertical longitudinal sectional view taken on the line $x$ $x$ of Fig. 1.

A represents a rectangular frame, having on its front side, at one corner, the projecting shoe B. On the upper side of the frame, near the center thereof, are secured blocks C, to which is bolted an axle, D. On one end of the axle is journaled the driving-wheel E, having a broad tread, and provided with a serpentine groove, F, on the inner side of its rim.

G represents a metallic bar, which passes through one of the blocks C, and has one end bent rearwardly, forming an arm, $g$, and the other end bent forwardly alongside the frame A, forming an arm, $g'$, the outer end of which is bent at right angles, forming a spindle for the supporting-wheel H, which is much smaller than the driving-wheel. The rear end of the arm $g$ is secured to the frame by a keeper, $g^2$.

I represents the tongue, which is secured at its rear end to near the center of the axle, as shown.

The usual finger-bar, K, is secured to the front of the frame A, and extends outwardly beyond one side thereof, and on the finger-bar is secured a cutter-bar, L.

M represents a right-angled lever, the inner end of which has an anti-friction roller, N, that runs in the groove F in the rear side of the driving-wheel. The outer end of the lever M has a rearward-extending arm, M', the outer end of which is pivoted to the rear end of a lever, O. The front end of the lever O is slotted, as at $o$, and through this slot passes a bolt, $o'$, that connects the lever O with the cutter-bar.

P represents a link that has its front end pivoted to the frame A, near the inner side thereof, and its rear end fulcrumed to the lever M.

R represents a lever that has an anti-friction roller, $r$, at one end, which roller runs in the groove F in the front side of the driving-wheel, and the outer end of the lever R has a rearward-extending arm, R', the rear or outer end of which is pivoted to the lever O. A bar, S, has its front end pivoted to the lever R and its rear end provided with a slot, $s$, through which passes a bolt, S', to secure the rear end of the bar to the rear side of the frame A, and permit the said bar to be moved longitudinally a distance corresponding to the length of the slot $s$.

A bracket, T, having a segmental rack, $t$, is secured to the rear side of the frame A, alongside the rear end of the bar S, and to the said bracket is pivoted a lever, U, the lower end of which is connected to the rear end of the bar S by a link, $u$, and which lever has a spring-actuated bolt, V, that engages with the segmental rack and locks the lever U in any desired position.

W represents the usual driver's seat, which has a spring-supporting bar, $w$, secured to the axle.

When the hand-lever U is moved rearward, the bar S, which connects the lower end of the hand-lever with the lever R, moves the latter so as to cause its roller $r$ to engage the groove F in the front side of the driving-wheel, and a movement in the reverse direction is communicated to the free end of the lever M through the lever O, which connects the levers S and M, thereby causing the roller N on the latter lever to engage the groove in the rear side of the driving-wheel. As the latter revolves when the machine is drawn forward the levers M and R are moved endwise simultaneously in opposite directions, and cause the said levers to reciprocate the outer end of the lever O, and thereby operate the cutter-bar, as will be readily understood.

When the hand-lever U is moved forwardly in the position shown in dotted lines in Fig. 2, the levers M and R are moved laterally toward each other, so as to withdraw their rollers from the groove F, and thereby prevent the cutter-bar from reciprocating.

Having thus described my invention, I claim—

1. The combination, in a mowing-machine, of the frame A, the driving-wheel having the groove F, the cutter-bar, the lever M, engaging with the groove F, the lever O, connected to the cutter-bar and to the lever M, the link P, pivoted at one end to the frame A and at the rear end to the lever M, the lever R, engaging the groove F and connected to the lever O, and the movable link S, having one end pivoted to the lever R and the other end secured to the frame A, whereby by moving the link S endwise the levers M and R may be caused to engage with or disengage from the driving-wheel, substantially as described.

2. In a mowing-machine, the cutter-bar in combination with the lever O connecting with the same, the driving-wheel having the groove F, and the levers M R, working in said groove and connected to the lever O at different points, as set forth.

In testimony that I claim the foregoing as my own I have hereto affixed my signature in presence of two witnesses.

SAMUEL GARVIN.

Witnesses:
THOMAS A. ANDERSON,
W. R. MERCER.